United States Patent
Templeton et al.

(10) Patent No.: US 9,367,717 B1
(45) Date of Patent: *Jun. 14, 2016

(54) READ HEAD ARRAY STITCHING

(71) Applicant: Square, Inc., San Francisco, CA (US)

(72) Inventors: Thomas Templeton, San Francisco, CA (US); Daniel Jeffrey Post, San Mateo, CA (US)

(73) Assignee: Square, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/714,444

(22) Filed: May 18, 2015

Related U.S. Application Data (63) Continuation of application No. 14/057,322, filed on Oct. 18, 2013, now Pat. No. 9,033,235.

(51) Int. Cl.
*G06K 19/00* (2006.01)
*G06K 7/08* (2006.01)

(52) U.S. Cl.
CPC ...................... *G06K 7/087* (2013.01)

(58) Field of Classification Search
USPC .................. 235/435, 439, 449, 487, 494
See application file for complete search history.

(56) References Cited

U.S. PATENT DOCUMENTS

| | | | | |
|---|---|---|---|---|
| 7,810,729 B2 * | 10/2010 | Morley, Jr. | ............. | G06K 7/083 235/435 |
| 8,231,055 B2 | 7/2012 | Wen | | |
| 9,033,235 B1 * | 5/2015 | Templeton | ............. | G06K 7/084 235/435 |

OTHER PUBLICATIONS

Visdomine, L. P., "Magnetic stripe reader circuit," Retrieved from the Internet URL: http:/ /web.archive.org/web/20000301055608/http:/ /www.gae.ucm.es/- padilla/ extraworkImagamp.html, on May 9, 2012, pp. 1-4.
Visdomine, L. P., "Turning your mobile into a magnetic stripe reader," Retrieved from the internet URL: http://web.archive.org/web/20040927081729/http://www.gae.ucm.es/-padilla/extraworkImobilesoundtrack.html, on May 9, 2012, pp. 1-3.
Restriction Requirement mailed May 7, 2014, for U.S. Appl. No. 14/057,322, of Templeton, T., et al., filed Oct. 18, 2013.
Non Final Office Action mailed Jul. 21, 2014, for U.S. Appl. No. 14/057,322, of Templeton, T., et al., filed Oct. 18, 2013.
Notice of Allowance mailed Jan. 12, 2015, for U.S. Appl. No. 14/057,322, of Templeton, T., et al., filed Oct. 18, 2013.

* cited by examiner

*Primary Examiner* — Matthew Mikels
(74) *Attorney, Agent, or Firm* — Polsinelli PC (57) ABSTRACT

Read head array stitching techniques are described. A card reader includes an array of magnetic sensors (a read head array) for retrieving account information from a magnetic stripe of a financial transaction card. The magnetic sensors can be arranged in rows and columns. During a card swipe, each magnetic sensor receives a series of readings. A processor determines relative bit rates for each series of readings. The processor determines which sensor corresponds to which track of the magnetic stripe based on a comparison of the relative bit rates. The processor generates a data stream for at least one track based on portions of readings from each sensor during periods of time the sensor is determined to correspond to the track.

20 Claims, 9 Drawing Sheets

__READ HEAD ARRAY STITCHING__

CROSS-REFERENCE TO RELATED APPLICATIONS

This application is a continuation of U.S. patent application Ser. No. 14/057,322, filed Oct. 18, 2013, entitled "READ HEAD ARRAY STITCHING"; which is hereby expressly incorporated herein by reference in its entirety.

BACKGROUND

Financial transaction cards, e.g., credit cards, debit cards, gift cards, or store cards, are used in many commercial transactions. For example, a store can use a point-of-sale (POS) system to process financial transaction card transactions of the store's customers. The financial transaction card can have a magnetic stripe attached to one face of the card. Account information, e.g., a card number, an expiration date, or a cardholder name, can be encoded in one or more data tracks on the magnetic stripe as magnetic particles having various orientations. In a transaction, a customer swipes a financial transaction card in a card reader of the POS system. The card reader includes a read head for reading the encoded account information. During a card swipe, the magnetic stripe moves across the read head. The read head detects the magnetic fields generated by the particles. The card reader then reproduces the account information based on variations the detected magnetic fields.

The card reader usually has a slot to guide the financial transaction card to move in a straight line across the read head. If the card swipe is not straight enough, the read head may be aligned with a wrong track, or with no track at all. The misalignment can cause a card read error. The customer will then re-swipe the card.

BRIEF DESCRIPTION OF THE DRAWINGS

Like reference symbols in the various drawings indicate like elements.

DETAILED DESCRIPTION

Read head array stitching techniques are described. A card reader includes an array of magnetic sensors (a read head array) for retrieving account information from a magnetic stripe of a financial transaction card. The magnetic sensors can be arranged in rows and columns. During a card swipe, each magnetic sensor receives a series of readings. A processor determines relative bit rates for each series of readings. The processor determines which sensor corresponds to which track of the magnetic stripe based on a comparison of the relative bit rates. The processor generates a data stream for at least one track based on portions of readings from each sensor during periods of time the sensor is determined to correspond to the track.

The features described in this specification can be implemented to achieve one or more advantages. For example, read head array stitching can reduce or eliminate card read errors for card readers having a small size. Some card readers can be devices suitable for plugging into a mobile computing device (e.g., into a smart phone, tablet computer, or wearable electronic device). Such plugin card readers can be smaller than a financial transaction card being swiped. For example, a card reader can be approximately one inch long and one inch wide, excluding plugs or wires. By comparison, a financial transaction card is typically more than three inches long and more than two inches wide. As a result, a slot for guiding the financial transaction card in a swipe can have a length (e.g., one inch) that is shorter compared to that of a conventional card reader, which typically has a slot that is longer than the length of a financial transaction card. A card swipe in a shorter guiding slot can be more prone to offset, drift, or rotation, resulting in higher likelihood of card read errors. Read head array stitching can compensate the card offset, drift, or rotation, and reduce the likelihood that a card swipe needs to be repeated. Fewer card swipes on a plugin card reader can improve user experience.

The details of one or more implementations of read head array stitching are set forth in the accompanying drawings and the description below. Other features, aspects, and advantages of read head array stitching will become apparent from the description, the drawings, and the claims.

Figure 1:
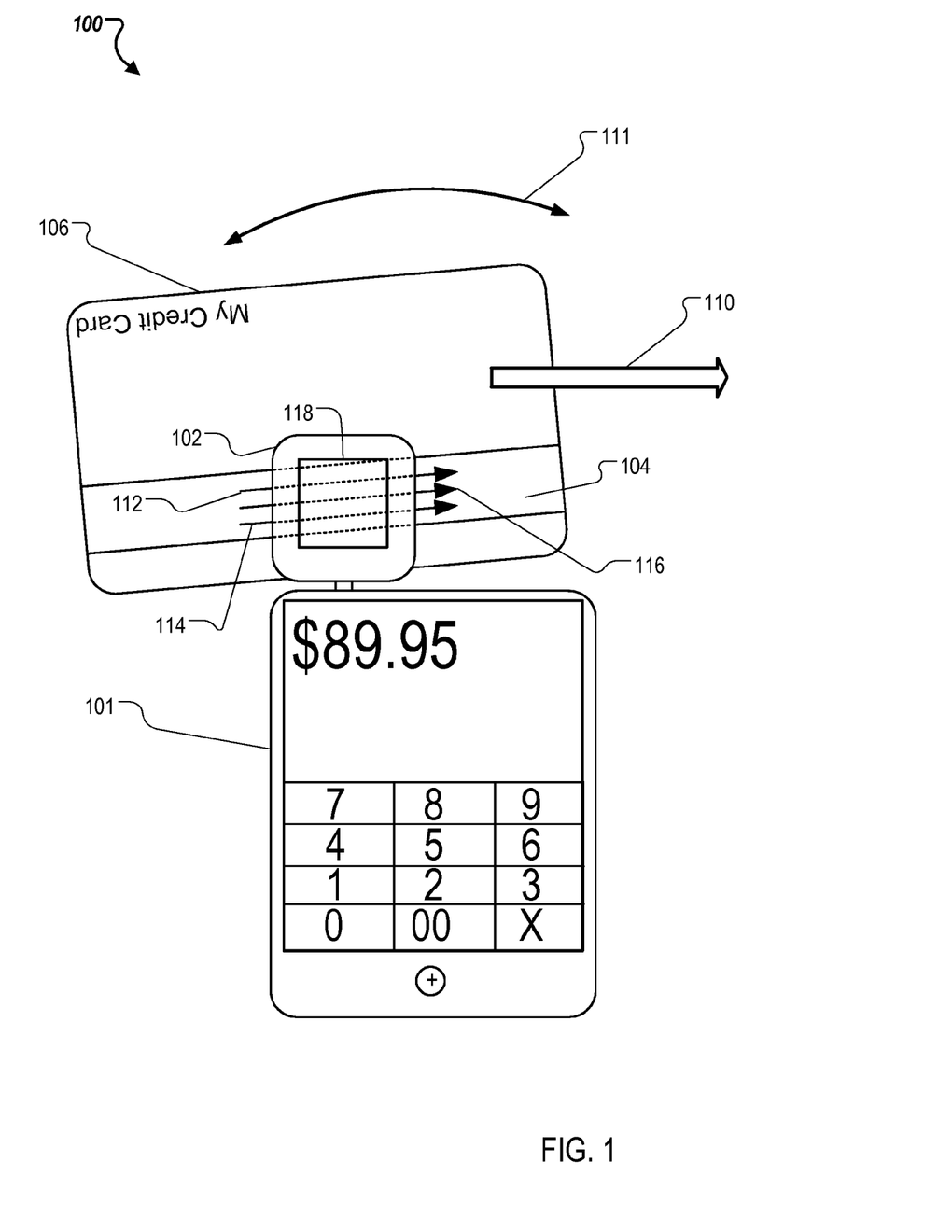
FIG. 1 is a diagram illustrating example read head array stitching techniques that handle a misaligned card swipe.

FIG. 1 is a diagram illustrating example read head array stitching techniques that handle a misaligned card swipe. A merchant can operate a POS system 100. The POS system 100 includes a mobile device 101 and a card reader 102. The POS system 100 receives a card swipe at the card reader 102. The card reader 102 is a device configured to read account information from a magnetic stripe 104. The magnetic stripe 104 is a band of magnetic material attached to a financial transaction card 106. The magnetic material includes magnetic particles, e.g., iron-based particles. The account information is encoded in magnetism of such particles. The card reader 102 is a small device configured to plug into the mobile device 101. The mobile device 101 is a portable computing device including a processor, memory, and a receptacle for receiving the card reader 102. The mobile device 101 can execute a computer program to perform client-side authorization operations. The client-side authorization operations can include at least a portion of authorizing payment from the financial transaction card 106 for purchasing an item of goods or services. The other portions of authorizing the payment can be performed by a server connected to the mobile device 101 through a secure communications network.

The card reader 102 includes a guiding slot. The guiding slot is a generally planar notch that runs horizontally across the card reader 102. The card reader 102 receives a card swipe 110 horizontally from left to right through the guiding slot. Due to the small size of the card reader 102 relative to the financial transaction card 106, the guiding slot is relatively short laterally. Instead of swiping perfectly from left to right, a user might make a misaligned swipe with the financial transaction card 106. In the misaligned swipe, the financial transaction card 106 may be offset from the bottom of the guiding slot. The financial transaction card 106 may drift, e.g., swipe at a slightly slanting angle and move perpendicularly to the swipe direction, e.g., vertically, in the example shown. In addition, during the misaligned swipe, the financial transaction card 106 may rotate (111) about an axis perpendicular to the plane of the guiding slot. For example, the financial transaction card 106 may wiggle in the guiding slot.

The magnetic stripe 104 can include multiple tracks, e.g., tracks 112, 114, and 116, of information. Each track may store the same or different portions of the account information. For example, a track may store a one-character start sentinel, account number, expiration date, service code, optional pin verification key indicator, and a longitudinal redundancy check (LRC) calculated from other data on the track. At least one track may record the information at a different bit density. In particular, the outermost tracks can record the information at the same first bit density, and the middle track can record the information at a different, e.g., lower, second bit density. For example, a first track and a third track may record the information at 210 bits per inch; a second track may record the information at 75 bits per inch. Due to the misaligned swipe, the tracks may shift positions relative to the card reader 102 during a swipe.

The card reader 102 includes a read head array 118. The read head array 118 can include multiple rows of magnetic sensors. Each magnetic sensor can perform functions of a read head, including detecting magnetism in the particles in the magnetic stripe 104. Each row of magnetic sensors in the read head array 118 can be positioned to correspond to an expected position of a track. The expected position of a track is a position of the track when the card swipe is orthogonal, e.g., without offset, drift, or rotation relative to the card reader 102.

The magnetic sensors in the read head array 118 can be arranged in multiple columns, each column being separate from another column. In a misaligned swipe, track information may be distorted. Based on differences in readings from the different sensors, a processor in either the mobile device 101 or the card reader 102 can detect the misaligned swipe. The processor can compensate for the distortion caused by the misaligned swipe. After compensation, correct account information can be read from each track, despite the misalignment in the card swipe. Additional details on detecting and compensating a misaligned swipe are described below in reference to FIGS. 2 and 3.

The card reader 102 is shown in FIG. 1 as a device plugged in the mobile device 101. In various implementations, the card reader 102 can be any device having a short slot for card swipe. For example, the card reader 102 can be a handheld or tabletop card reader having a built-in processor, or a device wirelessly connected to a processor. In some implementations, the card reader 102 can be a device having a built in read head array 118 and a built-in application-specific integrated circuit (ASIC) chip configured to perform the operations of the processor.

Figure 2:
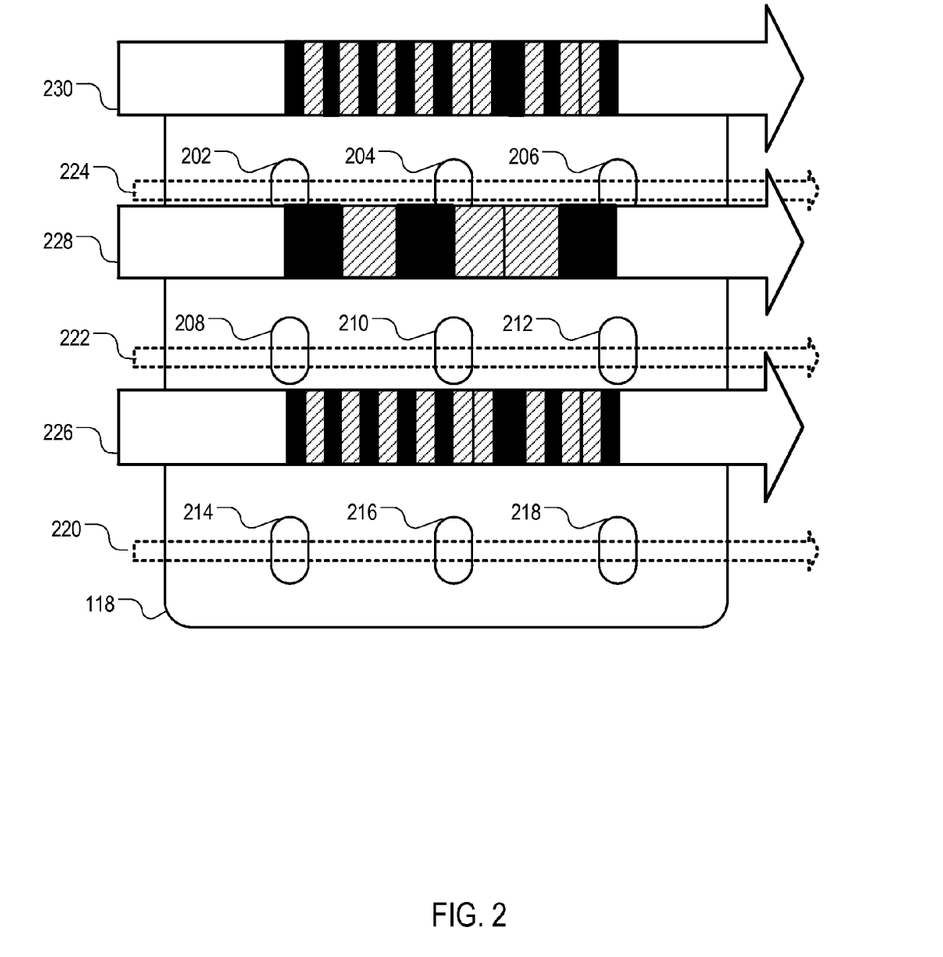
FIGS. 2 and 3 are diagrams illustrating an example read head array reading multiple tracks of a magnetic stripe of a financial transaction card.
Figure 3:
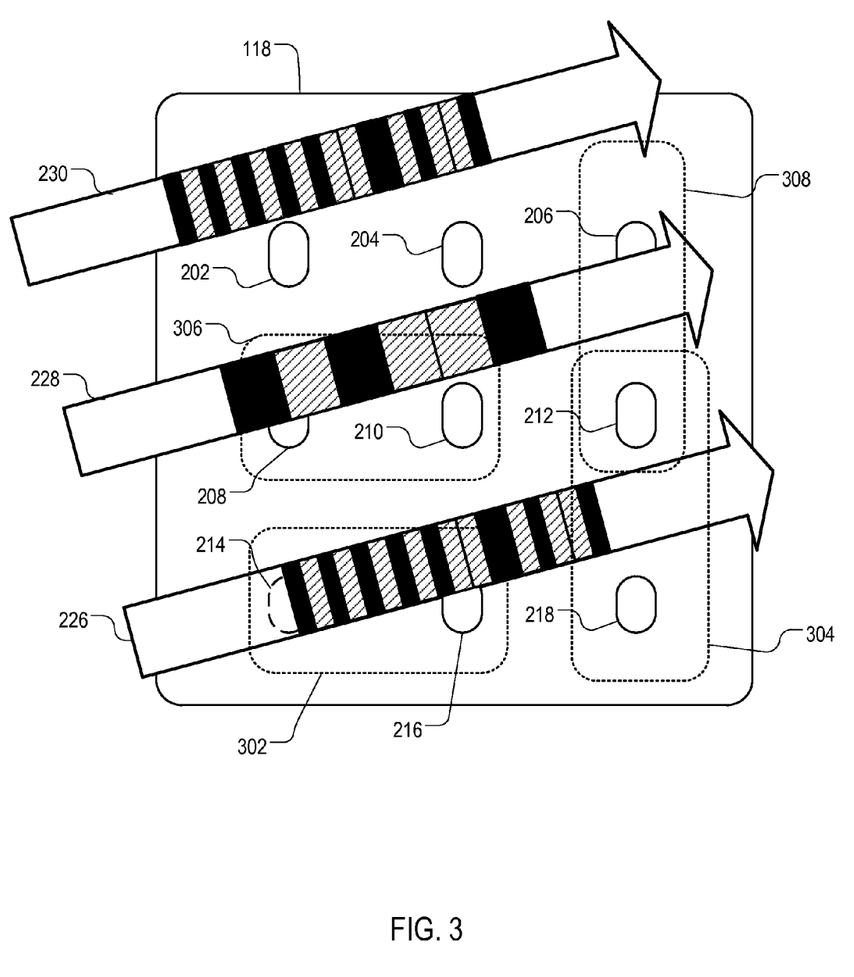

FIGS. 2 and 3 are diagrams illustrating an example read head array reading multiple tracks of a magnetic stripe of a financial transaction card. FIG. 2 illustrates read head array 118 reading tracks of a financial transaction card that swipes at an offset position.

Read head array 118 includes sensors 202, 204, 206, 208, 210, 212, 214, 216, and 218. Each of these sensors is a magnetic sensor configured to read information from a magnetic stripe swiping across the respective sensor. Sensors 202, 204, and 206 are positioned in a first row that is parallel to a swiping direction of a card. Likewise, sensors 208, 210, and 212 are positioned in a second row, and sensors 214, 216, and 218 a third row. The first row, second row, and third row of sensors are positioned to be aligned with first track 220, second track 222, and third track 224 (not drawn to scale) of the magnetic stripe in a perfect swipe (e.g., in a swipe where the card slides tightly along the guide slot).

In some implementations, a distance between each row of magnetic sensors is larger than a distance between tracks. For example, a magnetic stripe can be half an inch wide. Each of the tracks 112, 114, and 116 may be approximately one tenth (¹⁄₁₀) of an inch. A distance between neighboring tracks can be approximately one tenth of an inch. A distance between neighboring rows and columns can be larger than one tenth of an inch (e.g., 0.15 inches) to ensure that, at any given time, one sensor does not read signals from two tracks.

For various reasons, the swipe may be imperfect. For example, in an offset swipe, tracks 226, 228, and 230 (not drawn to scale) of a magnetic stripe of a card are not aligned with the three rows of sensors. A system operating read head array 118 can recording a stream for each sensor of sensors 202, 204, 206, 208, 210, 212, 214, 216, and 218. The stream can include a series of pulses caused by magnetic material passing across a respective sensor. For example, in a swipe, sensors 202 can detect a stream including a first series of magnetic signals. Sensor 208 can detect a stream including a second series of magnetic signals. Sensor 214 can detect a stream that includes weak magnetic signals, or no signals.

The system determines which sensor is reading which track based on the streams of signals. For example, the system can determine that a stream from sensor 208 has a higher bit rate then the bit rate of a stream from sensor 202. A setting of the system can indicate that a second track, e.g., the track 228, is encoded at a lower bit density than the first or third track. Based on the setting, the system can determine that sensor 202 is reading the second track, even though the sensor 202 is positioned to read a first (or third) track. The system can designate the stream from the sensor 202 as a stream from the second track.

The setting of the system can specify that the first track, e.g., track 226 and the third track, e.g., track 230, encodes the same account information. The system can determine that the sensor 214 does not record a stream. Alternatively, the system can determine that streams from the sensors 208 and 214 have same content, except that the readings in the stream from the sensor 208 are stronger than those in the stream from the sensor 214. The system can choose a stronger stream, e.g., the stream from the sensor 208, for decoding. The system can designate the stream from the sensor 208 as a stream from the first track and the third track.

Alternatively or additionally, the system can determine that streams from a row of sensors, e.g., sensors 214, 216, and 218 each have a signal strength that is below an acceptable signal strength threshold. In response, the system can determine that streams from a lowest row of sensors, e.g., sensors 208, 210, and 212, that have signal strengths that satisfy the signal strength threshold are streams from the lowest track, e.g., track one.

FIG. 3 illustrates read head array 118 reading tracks of a financial transaction card that swipes with rotation or drift. In a horizontal card swipe, a financial transaction card may have vertical movement that causes tracks in the magnetic stripe of the card to shift between rows of sensors. In the example shown, tracks 226, 228, and 230 move upwards in a manner in which magnetic information in first track 226 is read by sensor 214 in a first row at certain time during the swipe, and then by sensor 212 in a second row at a later time.

A system operating read head array 118 can record a data stream from each of sensors 202 through 218. The system can perform a blur operation or a smoothing function on each of the streams. The system can determined one or more regions of maximum signal strength. The system can then decode the regions of maximum signal strength.

For example, the system can determine that, at a first time T0, a region 302 including sensors 214 and 216 records a series of readings. The system can determine that the series of readings are strongest for a track (e.g., track 226) having a first bit rate. The system can determine that, at a second time T1, a region 304 that includes sensors 212 and 218 receives the series of readings at the same first bit rate. The system can determine that strengths of the readings as read by the sensors in region 304 are stronger than the strength of readings read from sensor 218 alone. Accordingly, the system can determine that the card is swiping at an angle, producing a vertical motion. The system can then determine which of region 302 and region 304 have stronger signal strength. The system can decode information on track 226 using the signals from streams in a region corresponding to a strongest signal.

Likewise, the system can determine signal strengths of streams for track 228. The system can determine that the strengths of signals read from sensor 208 and 210 (in region 306) include signals that belong to track 228. The system can determine that the signals belong to track 228 based on a second bit rate that is lower than the first bit rate. The system can determine that the streams of signals read from sensors 206 and 212 (in region 308) and streams of signals read from sensors 208 and 210 include the same signals. The system can determine that signal strengths in the stream from the region 308 are the strongest. In response, the system can decode information in track 228 using signals from the streams of sensors 206 and 212 in region 308. By stitching signals from a first region 302 including sensors 214 and 216 and a second region 304 including sensors 212 and 218, the system can compensate for an upward movement of the track 226 of a financial transaction card or a rotation of the track 226 of the financial transaction card. Likewise, by stitching signals from a third region 306 including sensors 208 and 210 and a fourth region 308 including sensors 206 and 212, the system can compensate for an upward movement or rotation of the track 228 of the financial transaction card.

Figure 4:
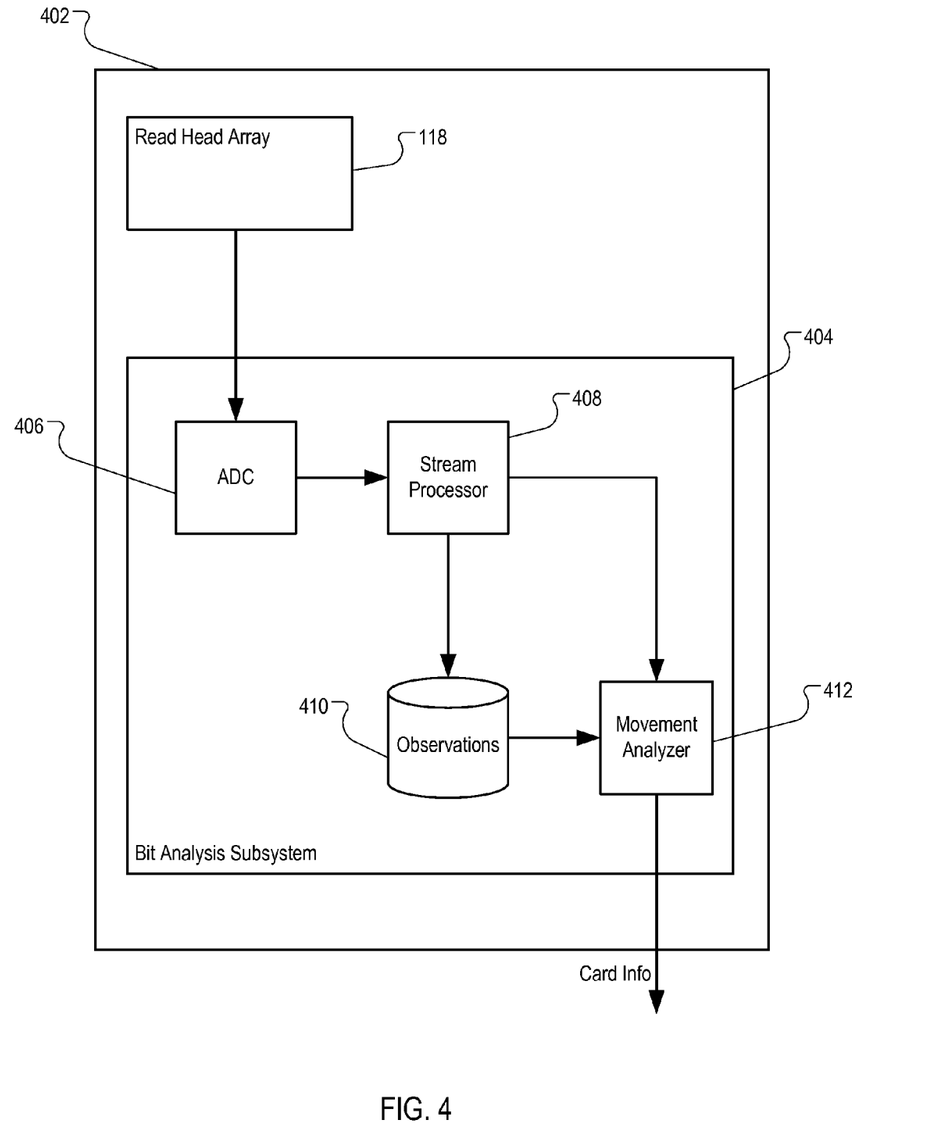
FIG. 4 is a block diagram illustrating components of an example read head array stitching system.

FIG. 4 is a block diagram illustrating components of an example read head array stitching system 402. The array stitching system 402 can be implemented in mobile device 101 or card reader 102 (of FIG. 1) or both. The read head array stitching system 402 includes read head array 118 as described in FIGS. 1-3.

The array stitching system 402 includes a bit analysis subsystem 404. The bit analysis subsystem 404 includes hardware and software (or firmware) components configured to process readings from read head array 118 generated during a card swipe. For example, at least a portion of the bit analysis subsystem 404 can be implemented on an ASIC chip.

The bit analysis subsystem 404 includes one or more analog-to-digital converters (ADCs) 406. The ADCs 406 are components of the bit analysis subsystem 404 configured to convert readings from each sensor of the read head array 118 from analog values into digital values. The digital values recorded by each sensor can form a stream of that sensor.

The ADCs 406 can feed the streams to a stream processor 408. The stream processor 408 is a component of the bit analysis subsystem 404 configured to record each stream as a timeline. In some implementations, the stream processor 408 can store the timelines in an observations data store 410. In some implementations, stream processor 408 can provide the timelines to a movement analyzer 412.

The movement analyzer 412 is a component of the bit analysis subsystem 404 configured to decode information in one or more tracks based on the data provided by the stream processor 408. The movement analyzer 412 can decode the information in parallel to reading the tracks, or decode the information after all readings are recorded in observations data store 410. The movement analyzer 412 can detect offset, drift, or rotation of a financial transaction card during a swipe. The movement analyzer 412 can compensate the offset, vertical movement, or rotation using techniques described above in reference to FIGS. 2 and 3. The movement analyzer 412 can provide the decoded information as account information to a transaction processor.

Figure 5A:
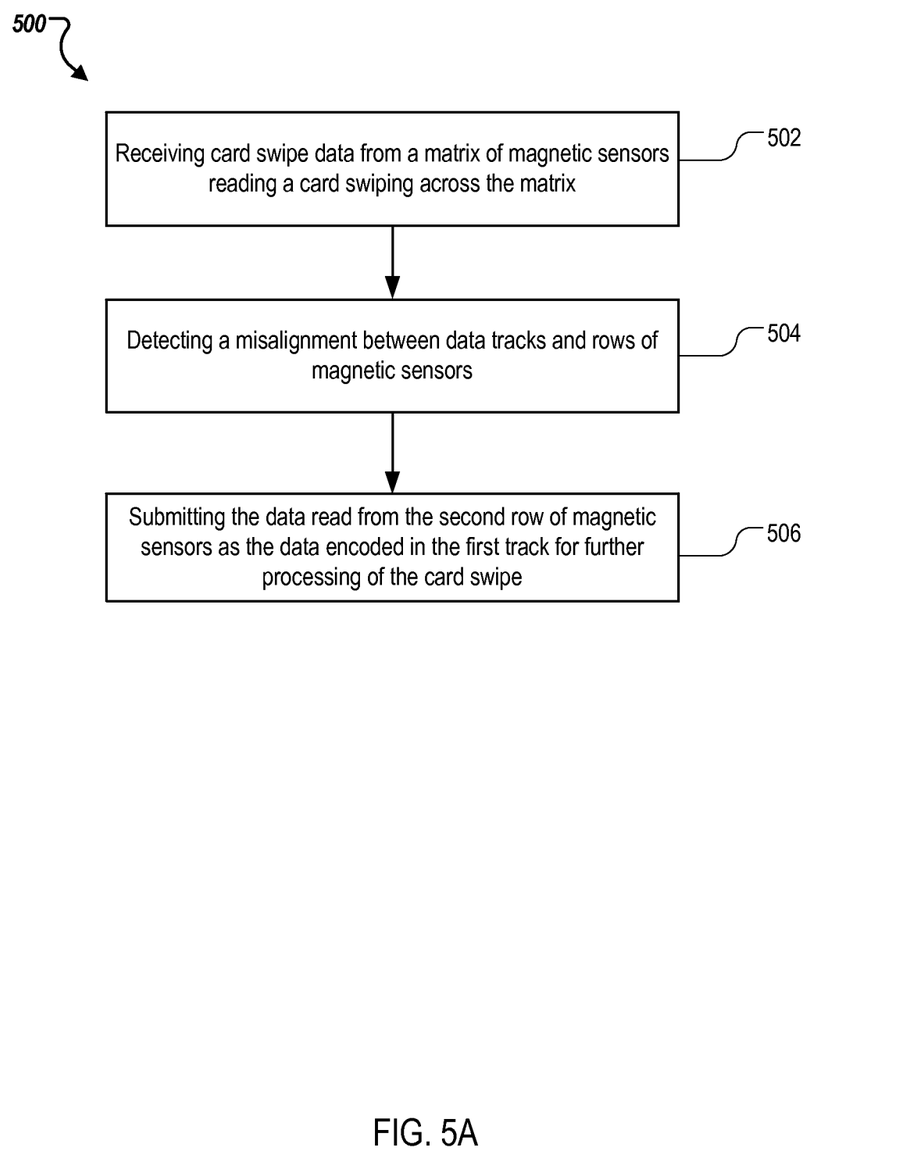
FIGS. 5A, 5B, and 5C are flowcharts of example procedures of read head array stitching.

FIG. 5A is a flowchart of an example procedure 500 of read head array stitching. Procedure 500 can be performed by system that includes one or more computing devices, e.g., the read head array stitching system 402 of FIG. 4. The system can be a device having a read head array having a sensor matrix and one or more processors (e.g., ASIC chips). The read head array has a sensor matrix. The sensor matrix includes multiple columns and multiple rows of magnetic sensors. Each column is positioned at a non-zero distance from another column. Each row of magnetic sensors configured to read a different data track of a magnetic stripe of a financial transaction card. A distance between each row of magnetic sensors is greater than width of a data track of the magnetic stripe and a distance between two data tracks of the magnetic stripe.

The one or more processors receive (502) card swipe data from the read head array during the card swipe. In the card swipe, a magnetic stripe of a financial transaction card moves across the sensor matrix.

The financial transaction card can be a credit card, debit card, store card, or gift card. The magnetic stripe of the financial transaction card can include three tracks of data. At least one of the three tracks of data is designed to have a bit density of 75 bits per inch. At least one of the three tracks of data being designed to have a bit density of 210 bits per inch.

The sensor matrix can be a three-by-three matrix of magnetic sensors configured to read from the three tracks. The sensor matrix of magnetic sensors can be encased in a card-reading device (e.g., card reader 102 of FIG. 1) configured to be plugged into a mobile computing device. The mobile computing device can include a smart phone, a tablet computer, or a wearable computing device.

The one or more processors detect (504) a misalignment between data tracks and the rows of magnetic sensors during the card swipe. The misalignment can include at least one of an offset, a drift, or a rotation of the financial transaction card occurred during swiping. Determining the misalignment includes determining that at least one row of magnetic sensors in the sensor matrix is reading a data track that another row of magnetic sensors is positioned to read. Determining the misalignment is based on (1) a difference between bit density of encoding information on a first track and bit density of encoding information on a second track and (2) a difference between bit rate of signals read from a first row of the magnetic sensor and a bit rate of signals read from a second row of the magnetic sensor.

In response, the one or more processors submit (506) the data read from the second row of magnetic sensors as account information encoded in the first track for further processing of the card swipe.

Figure 5B:
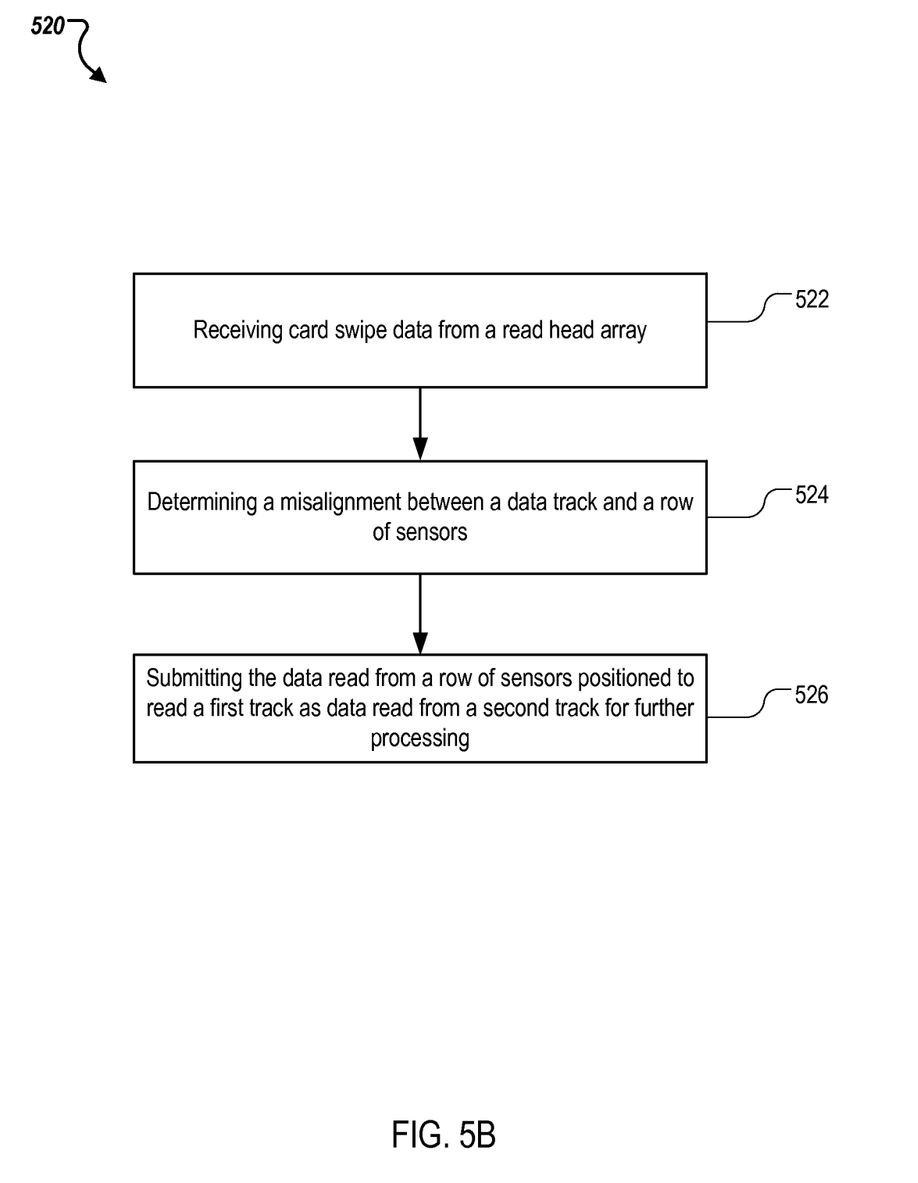

FIG. 5B is a flowchart of exemplary procedure 520 of read head array stitching. Procedure 520 can be performed by system that includes one or more computing devices, e.g., the read head array stitching system 402 of FIG. 4.

The system receives (522) card swipe data from a read head array including multiple columns and multiple rows of magnetic sensors arranged in a sensor matrix. Each row of the multiple rows is positioned to read a different track of data on a magnetic stripe of a financial transaction card. The card swipe data can include one or more streams of readings from the magnetic sensors. Each stream can be a series of readings along a timeline. Each magnetic sensor can produce a different stream.

The system determine (524), based on the card swipe data, that during the card swipe, a misalignment between a row of magnetic sensors and a track the row of magnetic sensors is positioned to read occurred. The misalignment can include an offset, a drift, or a rotation of the financial transaction card relative to the sensor matrix.

Determining that the misalignment occurred can be based on (1) a difference between a bit density (e.g., X bits per inch) of encoding data on a first track and a bit density (e.g., Y bits per inch) of encoding data on a second track, and (2) a difference between bit rate of signals read from a first row of the magnetic sensor (e.g., M bits per second) and a bit rate of signals read from a second row of the magnetic sensor (e.g., N bits per second). The system can determine which row of sensor read which track of data based on the ratio of X to Y and a ratio of M to N.

In some implementations, determining that the misalignment occurred is performed during swiping and in parallel to signal observations. The signal observations include reading the data in the first track or second track on the magnetic stripe. The system can determining that at least one of an alignment between the first row and the first track or an alignment between the second row and the second track has changed. The system can determine a time-based signal stream for each sensor in the matrix. The system then performs a smoothing function along each signal stream. The system can determine one or more regions of maximum strength from multiple time-based signal streams. The system can determine that at least one of an alignment between the first row and the first track or an alignment between the second row and the second track has changed based on shifts of the one or more regions of maximum strength between the rows of magnetic sensors. The system can determine that the offset, drift, or rotation occurred based on the change. In response, the system can select, in a time window, either the first track or second track based on a relative position of the first track and the second track and based on the changes. The system can compensate the change by switching to an unselected track at end of the time window.

In some implementations, determining that the misalignment occurred is performed after signal observations. The card swipe data is arranged into a multi-dimensional array of data. A first dimension of the multi-dimensional array is time. A second dimension of the multi-dimensional array can be a set of unique indices, each index corresponding to a collection of observations a different magnetic sensor.

In some implementations, in determining the misalignment occurred, the system can determine a time-based signal stream for each sensor in the matrix. The system then decodes across each of the time-based signal stream. The system can determine that an offset, a drift, or a rotation of the financial transaction card occurred during swiping based on results of the decoding. Decoding across each of the time-based signal stream can include determining one or more valid potential interpretations of track data based on the time-based signal stream. The system then estimates a decode confidence of each potential interpretation based on longitudinal redundancy check, character range check, and bit timing error measurement. The system can designate a valid potential interpretation as information encoded in the first track or second track based on a corresponding decode confidence.

In response, the system submits (526) the data read from the second row of magnetic sensors or the data determined from combined readings as the data encoded in the first track for further processing of the card swipe. The system can submit the data to a payment authorization system.

Figure 5C:
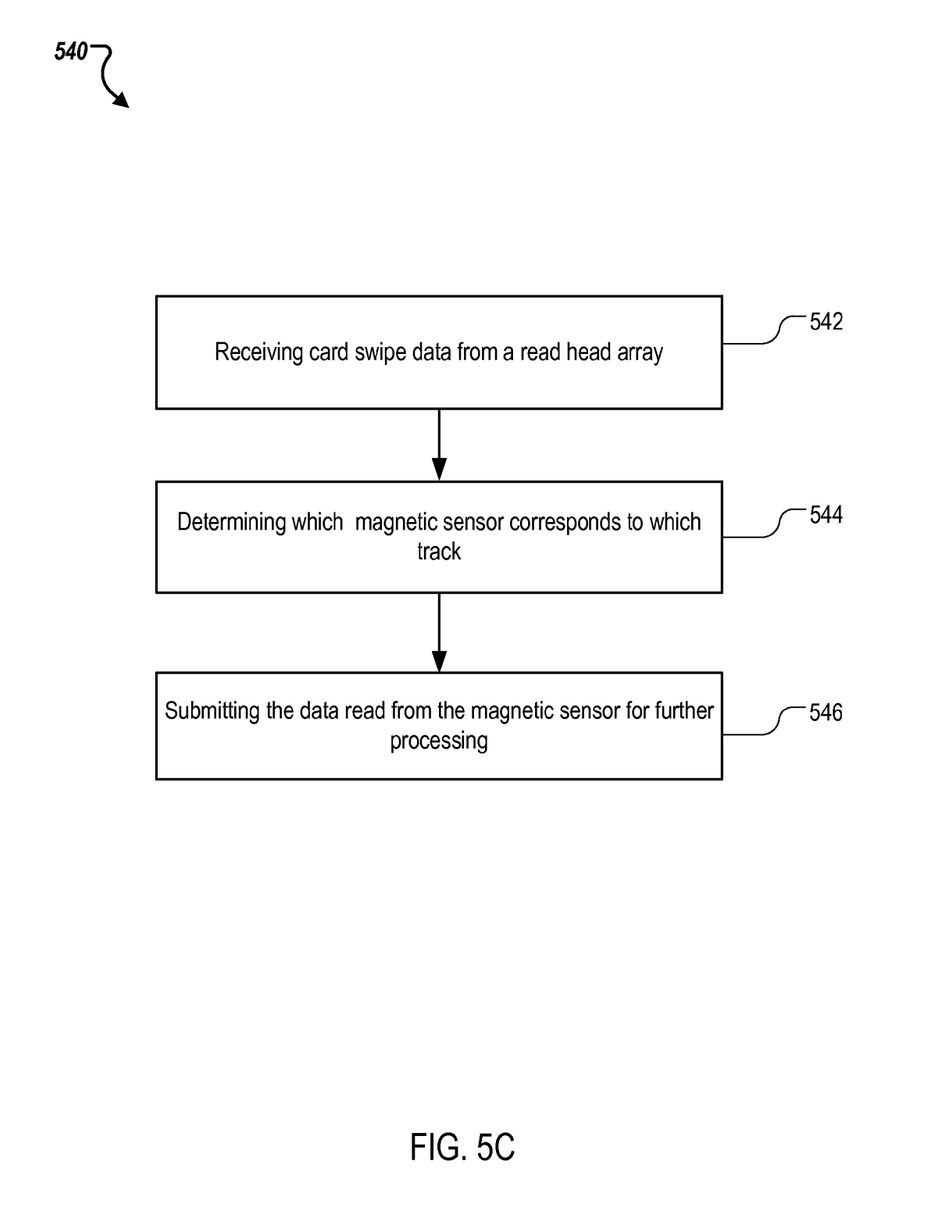

FIG. 5C is a flowchart of exemplary procedure 540 of read head array stitching. Procedure 540 can be performed by system that includes one or more computing devices, e.g., the read head array stitching system 402 of FIG. 4.

The system receives (542), during a card swipe through a read head, card swipe data from multiple magnetic sensors in a sensor matrix in the read head. The magnetic sensors are spaced apart along a first axis, e.g., a Y-axis, when the card swipe is along another axis, e.g., an X-axis. The card swipe can be across the first axis. The sensor matrix is configured to read a magnetic stripe of a magnetic stripe card. The magnetic stripe card can be, for example, a financial purchase card as described above, an identity card, an automatic teller machine (ATM) card, or a card key. The magnetic stripe has multiple tracks spaced apart along the first axis when the magnetic stripe card is swiped.

The system determines (544), based on the card swipe data received from the magnetic sensors, which of the magnetic sensors corresponds to at least one of the plurality of tracks. The card swipe data includes one or more streams of readings from the magnetic sensors. Determining which of the magnetic sensors corresponds to at least one of the tracks can include, for example, determining that a first magnetic sensor of the sensor matrix, positioned to read a first track of the magnetic stripe, reads a second track of the magnetic stripe during the card swipe.

Operations of determining that the first magnetic sensor of the sensor matrix reads the second track of the magnetic stripe instead of reading the first track can include performing a procedure as follows. The system determines that a first bit rate of a stream read by the first magnetic sensor is different from a second bit rate of a stream read by a second magnetic sensor of the sensor matrix positioned to read a second track. The system can determine, based on a difference between a first bit density of information encoded in the first track and a second bit density of information encoded in the second track, that a difference between the first bit rate and the second bit rate indicates that the first magnetic sensor is aligned with the second track during at least portion of the card swipe. The system can then determine that the first magnetic sensor of the sensor matrix reads a second track of the magnetic stripe for the portion of the card swipe For example, the system can determine that the first bit rate is lower than the second bit rate. In implementations where the first track has a higher bit density than the second track, the system can determine that the first magnetic sensor is reading the second track upon determining that the bit rate from the first sensor is lower than bit rate from the second sensor, rather than higher for at least a portion of the swipe. Upon determining that the bit rate from the first sensor changed back to normal, e.g., is higher than the bit rate from the second sensor, the system can determine that the first sensor is reading the first track.

In some implementations, determining which of the magnetic sensors corresponds to at least one of the tracks is performed during swiping and in parallel to signal observations. The signal observations include reading the data in the first track or second track on the magnetic stripe. In some implementations, determining which of the magnetic sensors corresponds to at least one of the plurality of tracks is performed after the signal observations. After the card swipe, the system can arrange the card swipe data into a multi-dimensional array of data. A first dimension of the multi-dimensional array can be time, and a second dimension of the multi-dimensional array and be a set of unique indices. Each index can correspond to observations from a different magnetic sensor.

In some implementations, the sensor matrix includes magnetic sensors arranged in multiple columns and multiple rows. Each row of the magnetic sensors can be spaced apart from a next row along the first axis, e.g., a Y-axis. Each column of the magnetic sensors being spaced apart from a next column along a second axis that is perpendicular to the first axis, e.g., an X-axis along which the card swipes. The system can determine which of the magnetic sensors corresponds to at least one of the plurality of tracks by performing the following procedure. The system can determine that a same signal pattern is read, at a first time, by a first magnetic sensor located at a first row and a first column and then read, at a second time, by a second magnetic sensor located at a second row and a second column. The first row is different from the second row, and the first column is different from the second column. In response, the system can determine that, at the first time, the first magnetic sensor corresponds to the first track and that, at the second time, the second magnetic sensor corresponds to the first track. The system can select, in a time window, e.g., a time window defined by the first time and the second time, the first track or second track based on a relative position of the first track and the second track and based on the readings from the first magnetic sensor and the second magnetic sensor. The system can switch to an unselected track at end of the time window.

The system submits (546) the data read from the at least one of the plurality of tracks for further processing of the card swipe, e.g., for money transfer authorization.

Exemplary Mobile Device Architecture

Figure 6:
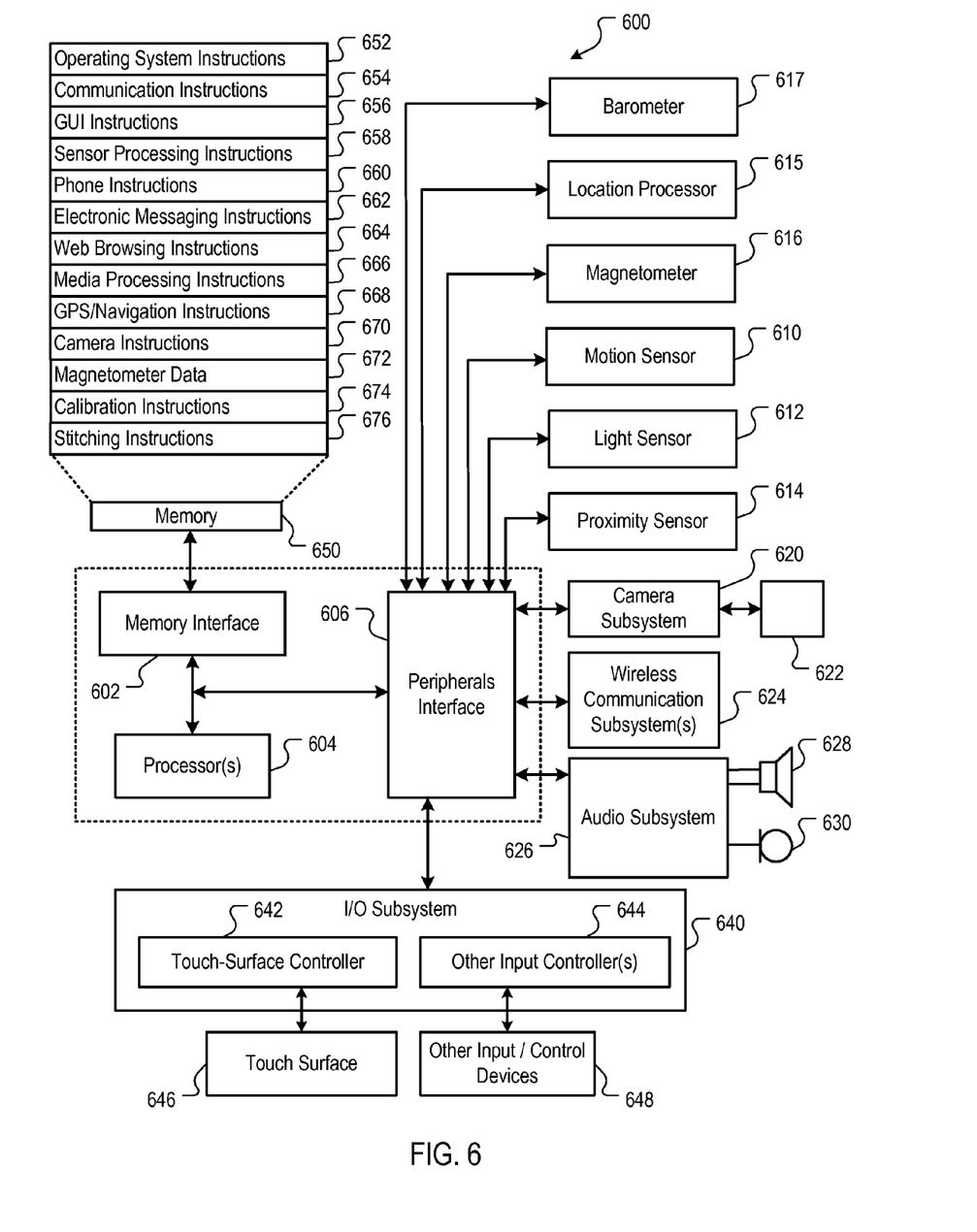
FIG. 6 is a block diagram illustrating an example device architecture of a mobile device implementing the features and operations of FIGS. 1-5.

FIG. 6 is a block diagram illustrating exemplary device architecture 600 of mobile device 101 implementing the features and operations of FIGS. 1-5. Mobile device 101 can be a laptop computer, a tablet computer, a smart phone, or a wearable computing device (e.g., a smart wristwatch). Mobile device 101 can include memory interface 602, one or more data processors, image processors and/or processors 604, and peripherals interface 606. Memory interface 602, one or more processors 604 and/or peripherals interface 606 can be separate components or can be integrated in one or more integrated circuits. Processors 604 can include one or more application processors and one or more wireless processors. The various components in mobile device 101, for example, can be coupled by one or more communication buses or signal lines.

Sensors, devices, and subsystems can be coupled to peripherals interface 606 to facilitate multiple functionalities. For example, motion sensor 610, light sensor 612, and proximity sensor 614 can be coupled to peripherals interface 606 to facilitate orientation, lighting, and proximity functions of the mobile device. Location processor 615 (e.g., GPS receiver) can be connected to peripherals interface 606 to provide geopositioning. Electronic magnetometer 616 (e.g., an integrated circuit chip) can also be connected to peripherals interface 606 to provide data that can be used to determine the direction of magnetic North. Thus, electronic magnetometer 616 can be used as an electronic compass. Motion sensor 610 can include one or more accelerometers configured to determine change of speed and direction of movement of the mobile device. Barometer 617 can include one or more devices connected to peripherals interface 606 and configured to measure pressure of atmosphere around the mobile device.

Camera subsystem 620 and an optical sensor 622, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which a mobile device is intended to operate. For example, a mobile device can include communication subsystems 624 designed to operate over a GSM network, a GPRS network, an EDGE network, a Wi-Fi™ or WiMax™ network, and a Bluetooth™ network. In particular, the wireless communication subsystems 624 can include hosting protocols such that the mobile device can be configured as a base station for other wireless devices.

Audio subsystem 626 can be coupled to a speaker 628 and a microphone 630 to facilitate voice-enabled functions, such as voice recognition, voice replication, digital recording, and telephony functions. Audio subsystem 626 can be configured to receive voice commands from the user.

I/O subsystem 640 can include touch surface controller 642 and/or other input controller(s) 644. Touch surface controller 642 can be coupled to a touch surface 646 or pad. Touch surface 646 and touch surface controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 646. Touch surface 646 can include, for example, a touch screen.

Other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of speaker 628 and/or microphone 630.

In one implementation, a pressing of the button for a first duration may disengage a lock of the touch surface 646; and a pressing of the button for a second duration that is longer than the first duration may turn power to mobile device 101 on or off. The user may be able to customize a functionality of one or more of the buttons. The touch surface 646 can, for example, also be used to implement virtual or soft buttons and/or a keyboard.

In some implementations, mobile device 101 can present recorded audio and/or video files, such as MP3, AAC, and MPEG files. In some implementations, mobile device 101 can include the functionality of an MP3 player. Mobile device 101 may, therefore, include a pin connector that is compatible with the iPod. Other input/output and control devices can also be used.

Memory interface 602 can be coupled to memory 650. Memory 650 can include high-speed random access memory and/or non-volatile memory, such as one or more magnetic disk storage devices, one or more optical storage devices, and/or flash memory (e.g., NAND, NOR). Memory 650 can store operating system 652, such as Darwin®, RTXC®, LINUX®, UNIX®, OS X®, WINDOWS®, iOS®, Android®, or an embedded operating system such as VxWorks®. Operating system 652 may include instructions for handling basic system services and for performing hardware dependent tasks. In some implementations, operating system 652 can include a kernel (e.g., UNIX® kernel).

Memory 650 may also store communication instructions 654 to facilitate communicating with one or more additional devices, one or more computers and/or one or more servers. Memory 650 may include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes and instructions; camera instructions 670 to facilitate camera-related processes and functions; magnetometer data 672 and calibration instructions 674 to facilitate magnetometer calibration. The memory 650 may also store other software instructions (not shown), such as security instructions, web video instructions to facilitate web video-related processes and functions, and/or web shopping instructions to facilitate web shopping-related processes and functions. In some implementations, the media processing instructions 666 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 650. Memory 650 can store stitching instructions 676 that, when executed, can cause processor 604 to perform operations of bit analysis subsystem 402 as described above in reference to FIG. 4. The operations can include procedures 500 and 520 as described above in reference to FIGS. 5A and 5B.

Each of the above identified instructions and applications can correspond to a set of instructions for performing one or more functions described above. These instructions need not be implemented as separate software programs, procedures, or modules. Memory 650 can include additional instructions or fewer instructions. Furthermore, various functions of the mobile device may be implemented in hardware and/or in software, including in one or more signal processing and/or application specific integrated circuits.

Exemplary Operating Environment

Figure 7:
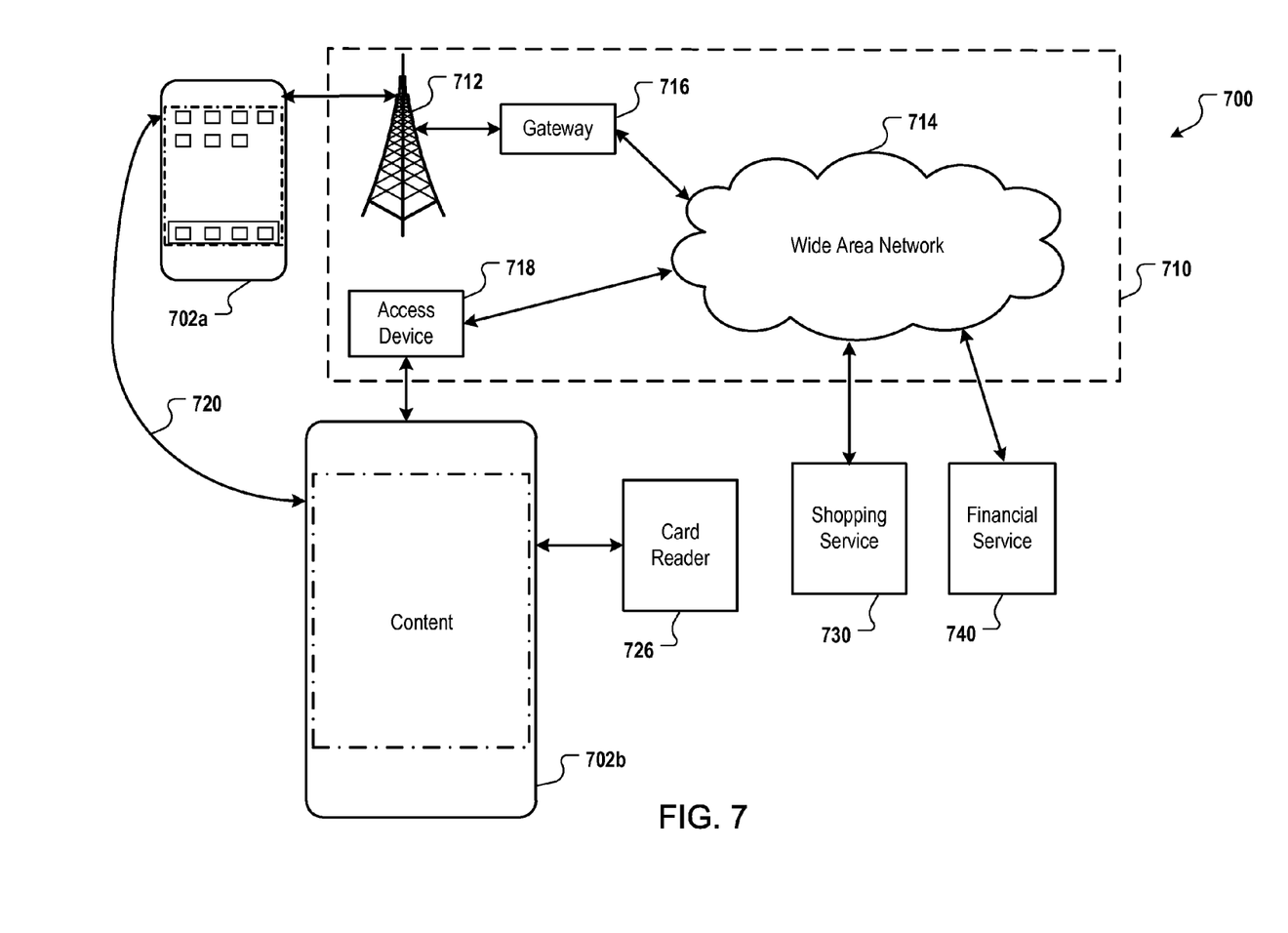
FIG. 7 is a block diagram of an example network operating environment for the mobile devices implementing the features and operations of FIGS. 1-5.

FIG. 7 is a block diagram of exemplary network operating environment 700 for the mobile devices implementing the features and operations of FIGS. 1-5. Each of mobile devices 702*a* and 702*b* can be mobile device 101 of FIG. 1. Mobile devices 702*a* and 702*b* can, for example, communicate over one or more wired and/or wireless networks 710 in data communication. For example, a wireless network 712, e.g., a cellular network, can communicate with a wide area network (WAN) 714, such as the Internet, by use of a gateway 716. Likewise, an access device 718, such as an 802.11g wireless access point, can provide communication access to the wide area network 714.

In some implementations, both voice and data communications can be established over wireless network 712 and the access device 718. For example, mobile device 702*a* can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 712, gateway 716, and wide area network 714 (e.g., using Transmission Control Protocol/Internet Protocol (TCP/IP) or User Datagram Protocol (UDP)). Likewise, in some implementations, the mobile device 702*b* can place and receive phone calls, send and receive e-mail messages, and retrieve electronic documents over the access device 718 and the wide area network 714. In some implementations, mobile device 702*a* or 702*b* can be physically connected to the access device 718 using one or more cables and the access device 718 can be a personal computer. In this configuration, mobile device 702*a* or 702*b* can be referred to as a "tethered" device.

Mobile devices 702*a* and 702*b* can also establish communications by other means. For example, wireless mobile device 702*a* can communicate with other wireless devices, e.g., other mobile devices, cell phones, etc., over the wireless network 712. Likewise, mobile devices 702*a* and 702*b* can establish peer-to-peer communications 720, e.g., a personal area network, by use of one or more communication subsystems, such as the Bluetooth™ communication devices. Other communication protocols and topologies can also be implemented.

Each of mobile device 702*a* and 702*b* can connect to card reading device 726. Card reading device 726 can include one or more card readers, e.g., card reader 118 of FIG. 1. Mobile device 702*a* or 702*b* can, for example, communicate with one or more services 730 and 740 over the one or more wired and/or wireless networks. For example, one or more shopping services 730 can provide pricing information to mobile devices 702*a* and 702*b*. Financial service 740 can process financial transactions submitted by mobile devices 702*a* and 702*b*, for example, by approving card payment or refund.

Mobile device 702*a* or 702*b* can communicate with one or more signal sources 750. Each signal source 750 can be a wireless beacon configured to broadcast a signal source identifier. The signal source identifier can include a UUID. Each signal source 750 can communicate to other devices through wide area network 714 or facilitate communication between mobile device 702*a* or 702*b* with the other devices. In some implementations, each signal source 750 can be independent from a communications network, and function solely as a beacon device.

Mobile device 702*a* or 702*b* can also access other data and content over the one or more wired and/or wireless networks. For example, content publishers, such as news sites, Really Simple Syndication (RSS) feeds, web sites, blogs, social networking sites, developer networks, etc., can be accessed by mobile device 702*a* or 702*b*. Such access can be provided by invocation of a web browsing function or application (e.g., a browser) in response to a user touching, for example, a Web object.

A number of implementations of the subject matter have been described. Nevertheless, it will be understood that various modifications can be made without departing from the spirit and scope of the subject matter.

What is claimed is:

1. A device comprising:
    a read head array having a sensor matrix, the sensor matrix comprising multiple columns and multiple rows of magnetic sensors, each column being positioned at a non-zero distance from another column; and
    one or more processors configured to perform operations comprising:
        receiving card swipe data from the read head array, the card swipe data generated by the read head array during a card swipe, wherein in the card swipe, a magnetic stripe of a financial transaction card moves across the sensor matrix, and wherein the card swipe data comprises one or more signals read from the magnetic sensors, each signal having a corresponding bit rate;

determining a misalignment between data tracks and the rows of magnetic sensors, wherein determining the misalignment is based on:

a difference between a first bit density of encoding information on a first track and a second bit density of encoding information on a second track, and a difference between a first bit rate of a first signal read from a first row of the magnetic sensor and a second bit rate of a second signal read from a second row of the magnetic sensor; and submitting data read from a second row of magnetic sensors as account information encoded in the first track for further processing of the card swipe.

2. The device of claim 1, wherein:
the financial transaction card is a credit card, debit card, gift card, or store card, the financial transaction card having a magnetic stripe comprising three tracks of data, at least one of the three tracks of data being designed to have a bit density of 75 bits per inch, and at least one of the three tracks of data being designed to have a bit density of 210 bits per inch, and the sensor matrix comprises a three-by-three matrix of magnetic sensors.

3. The device of claim 1, further comprising an output jack configured to be plugged into a mobile computing device including a smart phone, a tablet computer, or a wearable computing device.

4. The device of claim 1, wherein determining the misalignment comprises determining an offset, a drift, or a rotation of the financial transaction card occurred during swiping.

5. The device of claim 1, wherein each row of magnetic sensors is configured to read a different data track of a magnetic stripe of a financial transaction card, wherein a distance between each row of magnetic sensors is greater than width of a data track of the magnetic stripe and a distance between two data tracks of the magnetic stripe.

6. A device, comprising:
a read head; and
a processor configured to perform operations comprising:
during a card swipe through the read head, receiving card swipe data from a plurality of magnetic sensors in a sensor matrix in the read head, the magnetic sensors spaced apart along a first axis, wherein the sensor matrix is configured to read a magnetic stripe of a magnetic stripe card, the magnetic stripe having a plurality of tracks spaced apart, wherein during the card swipe, the tracks are spaced apart along the first axis;

determining, based on the card swipe data received from the magnetic sensors, which of the magnetic sensors corresponds to at least one of the plurality of tracks during the card swipe, wherein the card swipe data comprises one or more streams of readings from the magnetic sensors, each stream having a corresponding bit rate; and in response, submitting data read from the at least one of the plurality of tracks for further processing of the card swipe.

7. The device of claim 6, wherein:
the card swipe data comprise one or more streams of readings from the magnetic sensors, and
determining which of the magnetic sensors corresponds to at least one of the tracks comprises determining that a first magnetic sensor of the sensor matrix reads a second track of the magnetic stripe when the first sensor is in an expected position configured to read a first track of the magnetic stripe.

8. The device of claim 7, wherein determining that the first magnetic sensor of the sensor matrix reads the second track of the magnetic stripe comprises:
determining that a first bit rate of a stream read by the first magnetic sensor is different from a second bit rate of a stream read by a second magnetic sensor of the sensor matrix positioned to read a second track;
determining, based on a difference between a first bit density of information encoded in the first track and a second bit density of information encoded in the second track, that a difference between the first bit rate and the second bit rate indicates that the first magnetic sensor is aligned with the second track during at least portion of the card swipe; and
determining that the first magnetic sensor of the sensor matrix reads a second track of the magnetic stripe for the portion of the card swipe.

9. The device of claim 6, wherein determining which of the magnetic sensors corresponds to at least one of the plurality of tracks is performed during swiping and in parallel to signal observations, the signal observations comprising reading the data in a first track or second track on the magnetic stripe.

10. The device of claim 6, wherein:
determining which of the magnetic sensors corresponds to at least one of the plurality of tracks is performed after signal observations, and
the card swipe data is arranged into a multi-dimensional array of data, where first dimension of the multi-dimensional array is time, and a second dimension of the multi-dimensional array is a set of unique indices, each index corresponding to observations from a different magnetic sensor.

11. The device of claim 6, wherein the sensor matrix includes magnetic sensors arranged in a plurality of columns and a plurality of rows, each row of the magnetic sensors being spaced apart from a next row along the first axis, each column of the magnetic sensors being spaced apart from a next column along a second axis that is perpendicular to the first axis.

12. The device of claim 11, wherein determining which of the magnetic sensors corresponds to at least one of the plurality of tracks comprises:
determining that a same signal pattern is read, at a first time, by a first magnetic sensor located at a first row and a first column and then read, at a second time, by a second magnetic sensor located at a second row and a second column, wherein the first row is different from the second row and the first column is different from the second column; and
in response, determining that, at the first time, the first magnetic sensor corresponds to a first track and that, at the second time, the second magnetic sensor corresponds to the first track.

13. The device of claim 12, the operations comprising:
selecting, in a time window, the first track or second track based on a relative position of the first track and the second track and based on the readings from the first magnetic sensor and the second magnetic sensor; and
switching to an unselected track at end of the time window.

14. The device of claim 12, wherein the magnetic stripe card is a credit card, debit card, gift card, or store card, and each track of the magnetic stripe encodes account information.

15. A method comprising:
- during a card swipe through a read head, receiving card swipe data from a plurality of magnetic sensors in the read head, the magnetic sensors being configured to read a magnetic stripe of a magnetic stripe card, the magnetic stripe having a plurality of tracks spaced apart; and
- determining, based on the card swipe data, at least one of the magnetic sensors corresponds to at least one of the plurality of tracks during the card swipe, wherein the card swipe data comprises one or more signals read from the magnetic sensors, each signal having a corresponding bit rate.

16. The method of claim 15, wherein the plurality of magnetic sensors includes a first sensor having a first position that corresponds to an expected first position of a first track of the card, and a second sensor having a second position that corresponds to a second expected position of a second track of the card, and wherein determining which of the magnetic sensors corresponds to at least one of the plurality of tracks comprises:
- determining that the first sensor is positioned at the second expected position of the second track.

17. The method of claim 15, wherein determining which of the magnetic sensors corresponds to at least one of the plurality of tracks comprises:
- determining a misalignment between data tracks on the magnetic stripe of the card and rows of the magnetic sensor, the determining the misalignment being based on:
  - a difference between a first bit density of encoding information on a first track of the magnetic stripe card and a second bit density of encoding information on a second track of the magnetic stripe card.

18. The method of claim 15, wherein determining which of the magnetic sensors corresponds to at least one of the plurality of tracks comprises:
- determining a misalignment between data tracks on the magnetic stripe of the card and rows of the magnetic sensor, the determining the misalignment being based on:
  - a difference between a first bit rate of a first signal read from a first row of the magnetic sensor and a second bit rate of a second signal read from a second row of the magnetic sensor.

19. The method of claim 15, wherein determining which of the magnetic sensors corresponds to at least one of the plurality of tracks comprises:
- determining that a first sensor of the plurality of magnetic sensors is positioned at a second expected position of a second track of the card, and
- submitting data read from the first sensor as account information encoded in the second track.

20. The method of claim 15, further comprising:
- submitting data read from the at least one of the magnetic sensors as account information encoded in the at least one of the plurality of tracks for further processing.

* * * * *